(12) United States Patent  
Guy

(10) Patent No.: US 12,230,422 B2  
(45) Date of Patent: Feb. 18, 2025

(54) AIRCRAFT ELECTRICAL SYSTEM

(71) Applicant: Safran Seats GB Limited, Wales (GB)

(72) Inventor: Julian Guy, Wales (GB)

(73) Assignee: Safran Seats GB Limited, Cwmbran (GB)

( * ) Notice: Subject to any disclaimer, the term of this patent is extended or adjusted under 35 U.S.C. 154(b) by 149 days.

(21) Appl. No.: 17/983,172

(22) Filed: Nov. 8, 2022

(65) Prior Publication Data

US 2023/0144149 A1    May 11, 2023

(30) Foreign Application Priority Data

Nov. 11, 2021 (GB) ...................................... 2116225

(51) Int. Cl.
*H01B 7/00* (2006.01)
*G08C 19/00* (2006.01)

(52) U.S. Cl.
CPC ........... *H01B 7/0045* (2013.01); *G08C 19/00* (2013.01); *B64D 2221/00* (2013.01)

(58) Field of Classification Search
CPC .. H01B 7/0045; G08C 19/00; B64D 2221/00; G05B 19/0426; H04L 41/0803
See application file for complete search history.

(56) References Cited

U.S. PATENT DOCUMENTS

| | | | | |
|---|---|---|---|---|
| 2009/0125656 A1* | 5/2009 | Haas | ........................ | H04L 61/00 710/104 |
| 2015/0124391 A1* | 5/2015 | Martinez | ................. | G06F 1/182 361/679.31 |
| 2017/0185541 A1* | 6/2017 | Yeh | ........................ | G06F 13/102 |
| 2017/0341777 A1 | 11/2017 | Kumar et al. | | |
| 2019/0385057 A1* | 12/2019 | Litichever | ............... | H04L 63/14 |
| 2020/0331624 A1* | 10/2020 | Sheffield | ................. | B64D 41/00 |
| 2021/0394921 A1* | 12/2021 | O'Connor, II | ........ | B64D 45/00 |

OTHER PUBLICATIONS

Europe Patent Application No. 22205753.1, Search Report, dated Feb. 22, 2023, 9 pages.
United Kingdom Patent Application No. 2116225.0, Search Report, dated Jun. 21, 2022, p. 1.
Thanthry et al., "Aviation Data Networks: Security Issues and Network Architecture", Security Technology, 2004, pp. 77-81.

* cited by examiner

*Primary Examiner* — Vernal U Brown
(74) *Attorney, Agent, or Firm* — Kilpatrick Townsend & Stockton LLP

(57) ABSTRACT

A method of configuring an aircraft electrical system. The aircraft electrical system comprises a wiring harness and a plurality of electronic modules. The wiring harness comprises a plurality of connection points. The method comprises: connecting a first electronic module in the plurality to the wiring harness via a first connection point in the plurality; transmitting by the first electronic module, a connection point identification request; in response to the transmitting, receiving at the first electronic module from the wiring harness, an identifier of the first connection point; on the basis of the received identifier, determining configuration data for the first electronic module, the configuration data being associated with the first connection point; and configuring the first electronic module to operate in accordance with the determined configuration data.

14 Claims, 3 Drawing Sheets

AIRCRAFT ELECTRICAL SYSTEM

CROSS-REFERENCES TO RELATED APPLICATIONS

The present application claims priority from, and is a nonprovisional application of, U.K. Patent Application No. GB 2116225.0, entitled "Aircraft Electrical System" filed Nov. 11, 2021, the entire contents of which are herein incorporated by reference for all purposes.

TECHNICAL FIELD OF THE INVENTION

The present invention concerns aircraft electrical systems. More particularly, but not exclusively, this invention concerns a method of configuring an aircraft electrical system. The invention is particularly suited to aircraft cabin electrical systems.

BACKGROUND

Aircraft electrical systems often incorporate wiring harnesses, which serve to connect remote electrical subsystems. Such wiring harnesses typically have a number of connection points, to which an electronic module can be connected to provide power to and/or enable communication with the electronic module. Generally, each of the connection points of a wiring harness is associated with a particular location and/or function within the electrical system. For example, where the electrical system comprises an aircraft cabin avionics network, the connection points may be associated with light fittings or occupancy sensors positioned throughout the aircraft cabin. In such cases, the electronic module may comprise a lighting device or a sensor module. Other examples of electronic modules are heating and/or cooling units, and passenger control units. Such electronic modules for use in the aircraft cabin are sometimes known as line-replaceable units.

It is usually the case that connection points at different locations are associated with different intended functionality; that is to say that devices at different locations within the system are intended to behave differently. For example, a lighting device connected in a first location within an aircraft cabin may be required to behave in a different manner to another lighting device connected in a second, different location within the aircraft cabin. Thus, although both connection points should be connected to a lighting device, the same lighting device itself is not necessarily suitable to operate in both locations (as it must be configured to behave in a manner appropriate for its intended location).

Thus, there are a large number of unique electronic modules (for example, one for each required configuration of electronic module) that must be produced and managed. Even where electronic modules can share hardware (for example, in the case of lighting devices), the need for different behaviours at different locations requires multiple different software configurations, each of which must be independently certified and maintained. Furthermore, the need for large numbers of distinct parts which must be connected in specific locations increases the difficulty of installing the electrical system and therefore the chance of mistakes occurring (for example, by installing an electronic module in an inappropriate location). Thus, the requirement for a large number of unique electronic modules adds complexity to design, certification, and installation of the electrical system.

The present invention seeks to mitigate the above-mentioned problems. Alternatively or additionally, the present invention seeks to provide an improved aircraft electrical system.

SUMMARY

The present invention provides, according to a first aspect, a method of configuring an aircraft electrical system, wherein the electrical system comprises a wiring harness and a plurality of electronic modules, the wiring harness comprises a plurality of connection points, a first electronic module in the plurality is connected to the wiring harness via a first connection point in the plurality, and the method comprises transmitting by the first electronic module, a connection point identification request, in response to the transmitting, receiving at the first electronic module from the wiring harness, an identifier of the first connection point, on the basis of the received identifier, determining configuration data for the first electronic module, the configuration data being associated with the first connection point, and configuring the first electronic module to operate in accordance with the determined configuration data.

By transmitting a connection point identification request and, in response to the transmitting, receiving from the wiring harness an identifier of the connection point, the first electronic module can determine the connection point to which it has been connected. By subsequently determining configuration data for the first electronic module on the basis of the identifier (and thereby on the basis of the connection point to which the first electronic module is connected), the first electronic module can identify, and configure itself to operate in accordance with, configuration data specific to the connection point. Thus, the method of the present invention enables the use of a generic electronic module which is configured to automatically reconfigure itself to operate in a manner suitable for the connection point to which it is connected, and thereby in an appropriate manner for the location in the electrical system in which the electronic module has been installed.

The first electronic module may be a line-replaceable unit. The first electronic module may comprise one or more of: a lighting device, a sensor, a heating and/or cooling unit, a passenger control unit.

It may be that the transmitting of the connection point identification request is performed in response to the connecting of the first electronic module. The method may further comprise detecting that the first electronic module has been connected to the first connection point. In such cases, the transmitting may be in response to the detecting. The transmitting of the connection point identification request may be in response to receipt of user input to the first electronic module (for example, a user pressing a configuration button on the first electronic module or sending a configuration command to the first electronic module via a debugging/configuration interface of the first electronic module). The transmitting of the connection point identification request may be in response to receipt of a configuration command received via the wiring harness (for example, from a computing node of the electrical system). Such a configuration command may be broadcast by another computing element connected to the wiring harness. It will be appreciated that a computing element can transmit a broadcast message without any knowledge of the recipients, and thus doing so can allow the computing element to deliver a command to an unconfigured electronic module.

It may be that the connection point identification request is transmitted to a memory associated with the first connection point. In such cases, it may be that the identifier is received from the memory. Thus, the connection point identification request may comprise a memory access request or read command. It may be that the wiring harness comprises the memory. The first connection point may comprise a connector. The connector may have a connector backshell. In such cases, it may be that the memory is located within the connector backshell. It will be appreciated by the skilled person that the memory may alternatively be located in parts of the wiring harness other than a connector backshell. The memory may comprise a non-volatile memory. The memory may comprise one or more of an erasable programmable read-only memory (EEPROM), flash memory, and read-only memory (ROM).

It may be that the electrical system comprises a communication interface between the first electronic module and the memory. The communication interface may be configured to facilitate the transmission of memory access requests (for example, a connection point identification request) and/or data (for example, an identifier) between the memory and the first electronic module. In such cases, it may be that the communication interface includes a single wire. Thus, it may be that the communication interface is configured to provide half-duplex communication between the first electronic module and the memory. The transmitting of the connection point identification request and the receiving of the identifier may be via the communication interface.

It may be that determining the configuration data comprises identifying configuration data associated with the received identifier. It may be that identifying the configuration data comprises retrieving an entry from a look-up table (for example, an entry associated with the received identifier). The electrical system may comprise a central computing node. In such cases, it may be that determining the configuration data comprises transmitting the received identifier to the central computing node. In such cases, the determining may further comprise, in response to the transmitting of the identifier, receiving from the central computing node an indication of configuration data for use in configuring the first electronic module (for example, associated with the identifier and/or the first connection point). The indication of configuration data may comprise an indication of a network location (for example, a network address) from where the configuration data can be retrieved. The indication of configuration data may comprise an indication of one of a plurality of modes of operation pre-programmed into the electronic module.

It may be that the configuring comprises retrieving the configuration data from a memory (for example, comprised in the first electronic module). It may be that the configuring comprises retrieving the configuration data from another computing element (for example, one connected to the first electronic module via the wiring harness). It may be that a plurality of configuration states of the first electronic module are hard-coded into firmware or software running on one or more computing elements of the first electronic module. It may be that the configuring comprises causing the first electronic module (for example, the one or more computing elements of the first electronic module) to operate in a given one of the plurality of configuration states (for example, a configuration state associated with the received identifier).

Configuring the first electronic module may comprise causing the first electronic module to associate itself with a specific network address (for example, one associated with the received identifier and/or the first connection point).

Configuring the first electronic module may comprise causing the first electronic module to communicate via the wiring harness in accordance with one or more communication protocols (for example, associated with the received identifier and/or the first connection point). Configuring the first electronic module may comprise causing the first electronic module to operate in accordance with one or more operational parameters (for example, associated with the received identifier and/or the first connection point). For example, where the first electronic module comprises a lighting device, the one or more operational parameters may define one or more of: an intensity of light emission by the lighting device, a duration of light emission by the lighting device, a colour of light emission by the lighting device, and one or more trigger conditions for changes in intensity, duration, and/or colour of light emission by the lighting device. In a further example in which the first electronic module comprises a sensor, the one or more operational parameters may define one or more of: a sampling frequency of the sensor, a data format for transmission of the sensor data, and one or more trigger conditions for beginning or ceasing operation of the sensor.

The aircraft electrical system may comprise an aircraft cabin avionics network. In such cases, it may be that each of the plurality of connection points is associated with a different position within the aircraft cabin. For example, it may be that one or more connection points in the plurality are associated with lighting devices to be installed within the aircraft cabin. It may be that determining the configuration data comprises identifying configuration data suitable for a position associated with the first connection point. It may be that the configuring of the first electronic module comprises configuring the first electronic module to operate in accordance with the position associated with the first connection point.

It will be appreciated by the skilled person that the features described above in respect of the first electronic module and the first connection point may be repeated separately in respect of one or more further electronic modules and connection points. Thus, it may be that a second electronic module in the plurality is connected to the wiring harness via a second connection point in the plurality. In such cases, the method may further comprise transmitting by the second electronic module, a further connection point identification request. The method may further comprise, in response to the transmitting of the further connection point identification request, receiving at the second electronic module from the wiring harness, a further identifier of the second connection point. The method may comprise, on the basis of the received further identifier, determining further configuration data for the second electronic module, the further configuration data being associated with the second connection point. The method may comprise configuring the second electronic module to operate in accordance with the determined further configuration data.

It may be that the further configuration data differs from the configuration data. Thus, it may be that the configuration data and the further configuration data are such that the first and second electronic modules are configured to operate differently. It may be that the first electronic module and the second electronic module are, prior to configuration, substantially identical. It may be that, post-configuration, only software and/or firmware functionality differ between the first electronic module and the second electronic module.

The method may further comprise, on the basis of the received identifier, determining that the electronic module is connected to a connection point for which it is unsuitable. In such cases, it may be that the method further comprises, in response to the determining, generating an alert. The alert may comprise an audible alert (for example, sounding a buzzer) or a visible alert (for example, lighting a light or display of a warning message on a display). It may be that generating the alert comprises transmitting a signal to another computing node (for example, indicating that an incompatible electronic module has been connected to a connection point).

According to a second aspect of the invention there is provided a computer program product comprising instructions which, when executed by a computing device comprising a processor and memory, cause the computer to carry out a method of configuring an aircraft electrical system, wherein the electrical system comprises a wiring harness and a plurality of electronic modules, the wiring harness comprises a plurality of connection points, a first electronic module in the plurality is connected to the wiring harness via a first connection point in the plurality, and the method comprises transmitting by the first electronic module, a connection point identification request in response to the transmitting, receiving at the first electronic module from the wiring harness, an identifier of the first connection point, on the basis of the received identifier, determining configuration data for the first electronic module, the configuration data being associated with the first connection point, and configuring the first electronic module to operate in accordance with the determined configuration data.

According to a third aspect of the present invention there is provided an aircraft electrical system comprising a wiring harness, the wiring harness comprising a plurality of connection points, and a plurality of electronic modules, a first electronic module in the plurality being connected to the wiring harness via a first connection point in the plurality, wherein the first electronic module is configured to transmit, via the wiring harness, a connection point identification request, receive from the wiring harness an identifier of the first connection point, on the basis of the received identifier, determine configuration data for the first electronic module, the configuration data being associated with the first connection point, and configure the first electronic module to operate in accordance with the determined configuration data.

According to a fourth aspect of the invention there is provided a wiring harness comprising memory suitable for use in the method of the first aspect.

According to a fifth aspect of the invention there is provided an aircraft comprising an aircraft electrical system as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
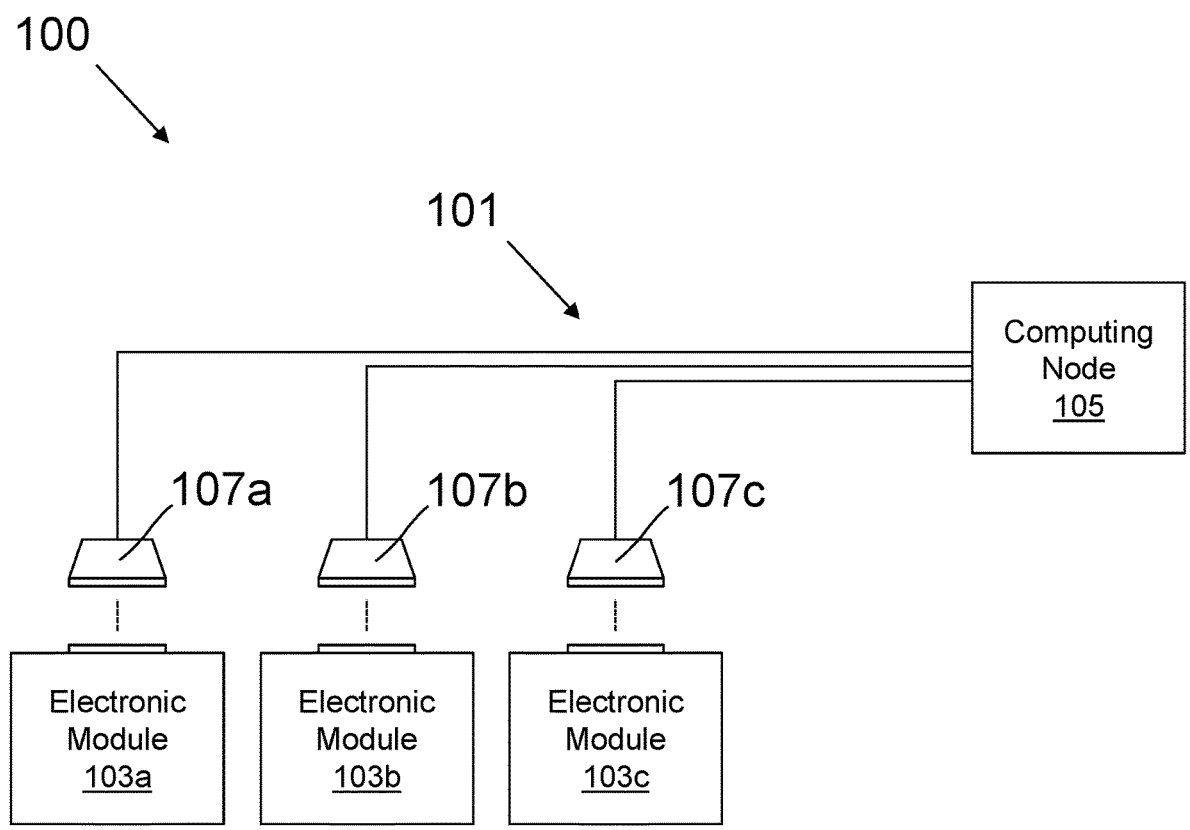
FIG. 1 shows a schematic view of an aircraft electrical system according to an embodiment of the invention.

FIG. 1 shows a schematic view of an aircraft electrical system 100 according to one embodiment of the invention. In this example, embodiment, the aircraft electrical system 100 comprises an aircraft cabin avionics network. The aircraft electrical system 100 comprises a wiring harness 101, a plurality of electronic modules 103*a*, 103*b*, 103*c*, and a central computing node 105.

The wiring harness 101 is configured to connect the plurality of electronic modules 103*a*, 103*b*, 103*c* to the central computing node 105 so as to facilitate communication between the electronic modules 103*a*, 103*b*, 103*c* and the central computing node 105. In other embodiments, the wiring harness 101 may also enable the distribution of electrical power to one or more of the plurality of electronic modules 103*a*, 103*b*, 103*c* and the central computing node 105.

In the embodiment illustrated in FIG. 1, the wiring harness 101 is shown as a series of direct point-to-point links between each of the plurality of electronic modules 103*a*, 103*b*, 103*c* and the central computing node 105. However, in other embodiments, the wiring harness 101 may also provide links between one or more (for example, all) of the plurality of electronic modules 103*a*, 103*b*, 103*c* (i.e. the wiring harness 101 may comprise a fully interconnected mesh network). Similarly, in yet other embodiments, the wiring harness 101 may link the plurality of electronic modules 103*a*, 103*b*, 103*c* and the central computing node 105 by means of a bus network topology, rather than by point-to-point links.

The wiring harness 101 comprises a plurality of connection points 107*a*, 107*b*, 107*c*, by means of which the plurality of electronic modules 103*a*, 103*b*, 103*c* are connected to the wiring harness 101. In this example embodiments, each of the plurality of connection points 107*a*, 107*b*, 107*c* is associated with a different position within the aircraft cabin.

In this example embodiment, each of the plurality of connection points 107*a*, 107*b*, 107*c* comprises an electrical connector. Each of the electronic modules 103*a*, 103*b*, 103*c* comprises a corresponding electrical connector, such that any one of the plurality of electronic modules 103*a*, 103*b*, 103*c* can be connected to any one of the plurality of connection points 107*a*, 107*b*, 107*c* by mating the connector of the electronic module with that of the desired connection point. Thus, although FIG. 1 shows electronic module 103*a* being arranged to connect to connection point 107*a*, electronic module 103*a* may equally be connected to either of the other connection points 107*b*, 107*c*. The same applies to the other two electronic modules 103*b*, 103*c*.

Figure 2:
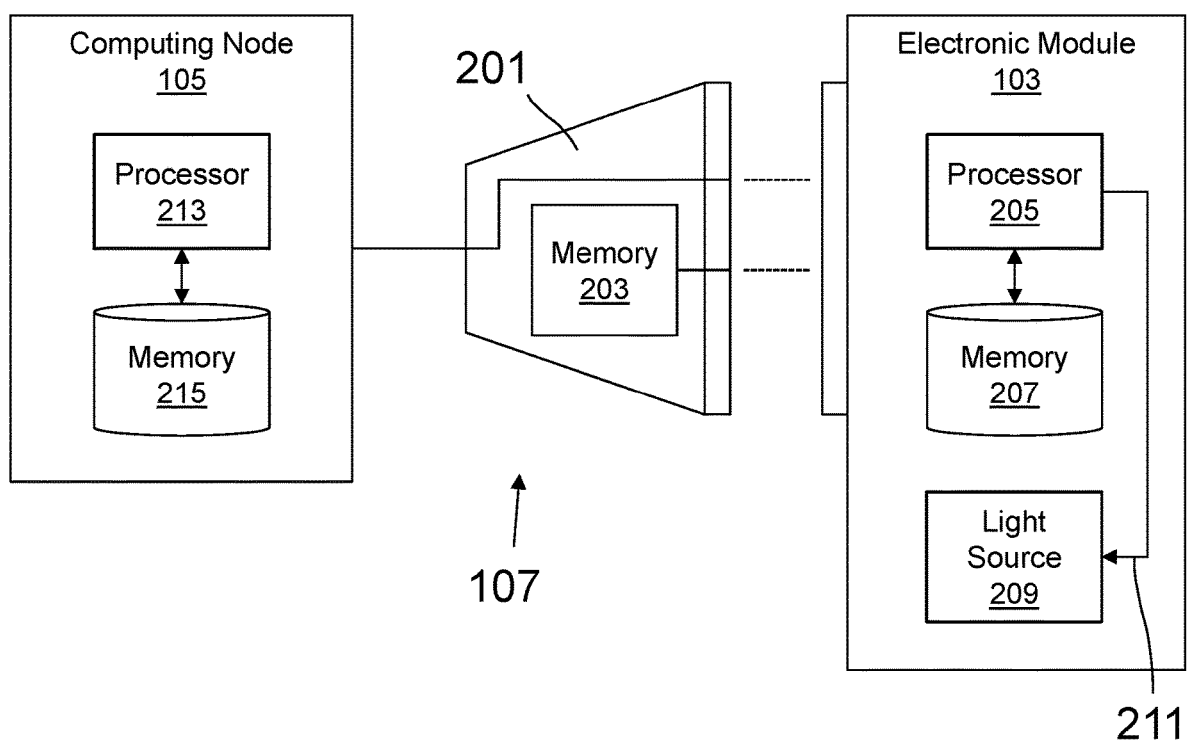
FIG. 2 shows an expanded schematic view of the aircraft electrical system of FIG. 1.

FIG. 2 shows an expanded schematic view of the aircraft electrical system 100. In this example embodiment, the connection point 107 comprises a connector having a connector backshell 201. The connector further comprises within the backshell 201 a non-volatile memory 203 (in this example, an EEPROM). The memory 203 comprises an identifier of the connection point 107. In this example embodiment, the identifier comprises a binary identification number, unique to the connection point 107. The memory 203 is connected, via the connector, to the electronic module 103. The connection point 107 is also configured to facilitate communication between the electronic module 103 and the central computing node 105.

The electronic module 103 comprises a processor 205 and an associated memory 207. The processor 205 is configured to control (for example, by executing one or more instructions stored in the associated memory 207) one or more of the functions of the electronic module 103. In this example embodiment, the electronic module 103 comprises a lighting device. Thus, the electronic module 103 comprises a light source 209. In this example embodiment, the processor 205 is configured to generate a light source control signal 211 to control the light source.

The processor 205 is connected to the memory 203 in the wiring harness 101 by a communication interface. In this example embodiment, the communication interface includes a single wire. Thus, the processor 205 and the memory 203 are configured to communicate (for example, to exchange connection point identification requests and connection point identifiers) via a half-duplex communication protocol operating over the single wire. It will be appreciated by the skilled person that there may also be one or more power supply and ground wires for the purposes of powering the memory. Such wires are not considered to form part of the communication interface.

The processor 205 is further configured to transmit a connection point identification request. In this example embodiment, the processor 205 is configured to transmit the connection point identification request to the memory 203. In this embodiment, the connection point identification request comprises a memory read command. The memory 203 is configured to respond to receipt of the connection point identification request by transmitting, to the electronic module 103 (in this case, to the processor 205) the stored identifier of the connection point 107. Processor 205 is further configured to receive the identifier.

The processor 205 is further configured to, on the basis of the received identifier, determine configuration data for the electronic module 103. By determining configuration data based on the received identifier, the processor 205 can determine configuration data associated with the connection point 107 (for example, configuration data suitable for configuring the electronic module 103 to operate at a position in the aircraft electrical system 100 associated with the connection point 107). In this example embodiment, the processor 205 is configured to determine the configuration data by searching a look-up table (for example, stored in memory 207) for an entry associated with the received identifier. In this case, the entry comprises a memory address for a location in memory 207 from where the configuration data can be retrieved. The processor 205 is further configured to, on the basis of the memory address, retrieve the determined configuration data.

The processor 205 is further configured to configure the electronic module 103 to operate in accordance with the determined configuration data. Thus, the processor 205 is configured to configure the electronic module 103 to operate in a manner suitable for the connection point 107 and the position in the aircraft electrical system 100 associated with the connection point 107. In this example embodiment, processor 205 is configured to control light source 209 (for example by generating light source control signal 211) in accordance with the configuration data.

The processor 205 is further configured to evaluate the received identifier to determine whether the electronic module 103 has been connected to a connection point for which it is unsuitable. For example, it may be that the electronic module 103 (which, as previously discussed, comprises a lighting device) has been connected to a connection point intended for an occupancy sensor. In such cases, the processor 205 is configured to, in response to the determining, generate an alert. In this example embodiment, generating the alert comprises transmitting a signal to the computing node 105 indicating that the electronic module 103 has been connected to an incompatible connection point. It will be appreciated that, in other embodiments, the electronic module 105 may comprise a warning light or buzzer. In such cases, it may be that the alert comprises an audible alert (for example, sounding the buzzer) or a visible alert (for example, lighting the warning light).

The computing node 105 also comprises a processor 213 and an associated memory 215. The processor 213 is configured to control (for example, by executing one or more instructions stored in the associated memory 215) one or more of the functions of the computing node 105.

Another embodiment of the invention comprises an aircraft electrical system substantially as described in respect of the first embodiment, except for the following differences. The processor 205 is configured to retrieve the determined configuration data not from memory 207, but from the central computing node 105. Thus, the processor 205 is configured to transmit the identifier to the central computing node 105. In this example embodiment, the processor 213 of the computing node 105 is configured to determine the configuration by searching a look-up table (for example, stored in memory 215) for an entry associated with the received identifier. In this case, the entry comprises a memory address for a location in memory 215 from where the configuration data can be retrieved. The processor 213 is further configured to, on the basis of the memory address, retrieve the determined configuration data from the memory 215 and transmit the retrieved configuration data to the electronic module 103 (for example, via the wiring harness 101 and the connection point 107). The processor 205 of the electronic module 103 is configured to receive the transmitted configuration data and, in response to the receipt of the configuration data, configure the electronic module 103 to operate in accordance with the received configuration data.

Figure 3:
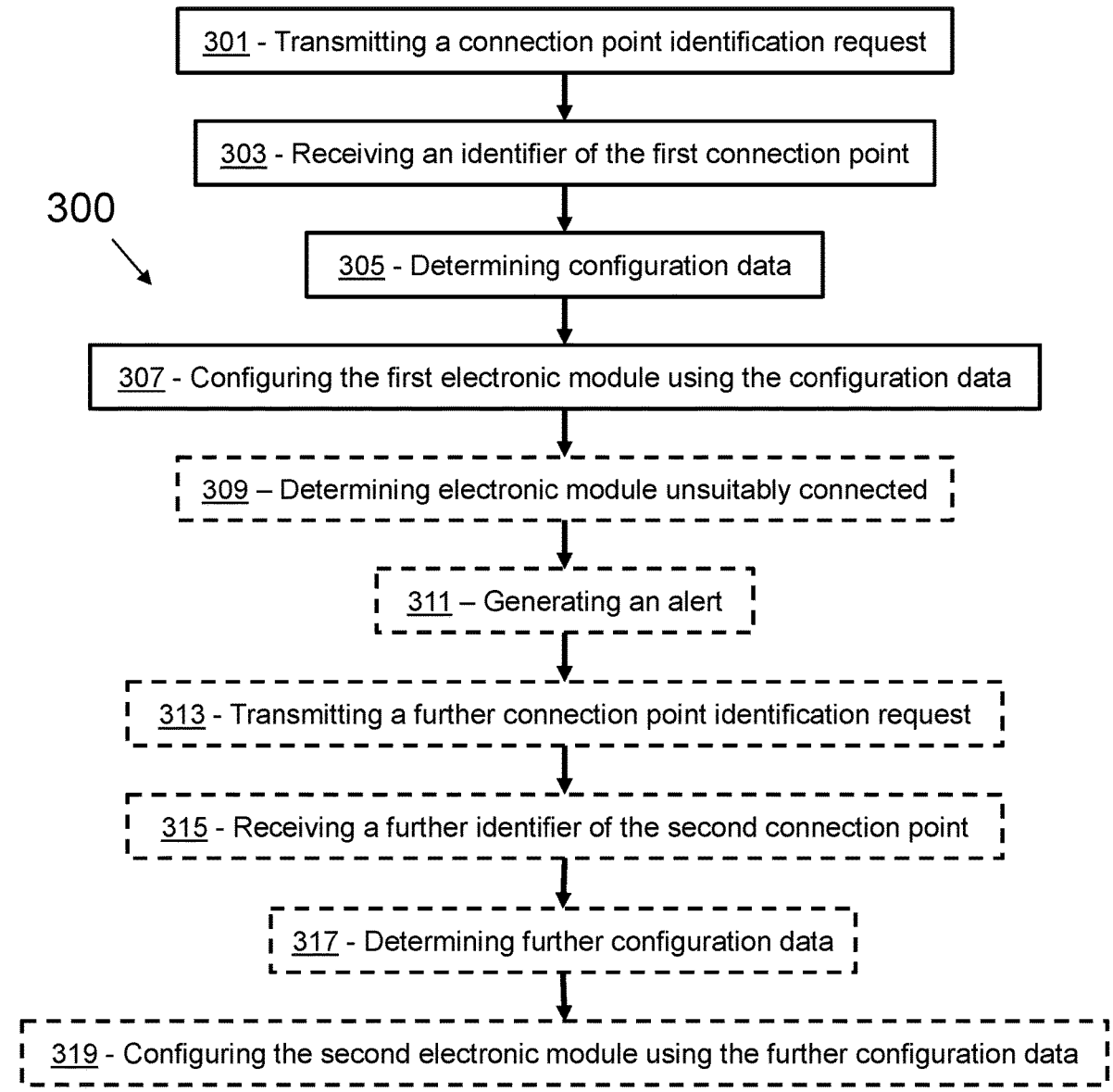
FIG. 3 shows a flow chart illustrating the steps of a method according to an embodiment of the invention.

FIG. 3 shows a flow chart illustrating the steps of a method 300 of configuring an aircraft electrical system according to another embodiment of the invention.

The electrical system comprises a wiring harness and a plurality of electronic modules. A first electronic module in the plurality is connected to the wiring harness via a first connection point in the plurality. The first electronic module may comprise one or more of: a lighting device, a sensor, a heating and/or cooling unit, a passenger control unit. The wiring harness comprises a plurality of connection points. The aircraft electrical system may comprise an aircraft cabin avionics network. In such cases, it may be that each of the plurality of connection points is associated with a different position within the aircraft cabin.

A first step of the method 300, represented by item 301, comprises transmitting by the first electronic module, a connection point identification request.

It may be that the connection point identification request is transmitted to a memory (for example, a memory associated with the first connection point). It may be that wiring harness comprises the memory. The first connection point may comprise a connector. The connector may have a connector backshell. In such cases, it may be that the memory is located within the connector backshell. It may be that the electrical system comprises a communication interface between the first electronic module and the memory. The transmitting of the connection point identification request may be via the communication interface. In such cases, it may be that the connection point identification request is transmitted to the computing node.

A second step of the method 300, represented by item 303, comprises, in response to the transmitting, receiving at the first electronic module from the wiring harness, an identifier of the first connection point.

It may be that the identifier is received from a memory (for example, the memory within the connector backshell of the first connection point). The receiving of the identifier may be via the communication interface.

A third step of the method 300, represented by item 305, comprises, on the basis of the received identifier, determining configuration data for the first electronic module, the configuration data being associated with the first connection point.

A fourth step, of the method 300, represented by item 307, comprises configuring the first electronic module to operate in accordance with the determined configuration data.

Where the aircraft electrical system comprises an aircraft cabin avionics network and each of the plurality of connection points is associated with a different position within the aircraft cabin, it may be that the configuring of the first electronic module comprises configuring the first electronic module to operate in accordance with the position associated with the first connection point.

An optional fifth step of the method 300, represented by item 309, comprises, on the basis of the received identifier, determining that the first electronic module is connected to a connection point for which it is unsuitable.

An optional sixth step of the method 300, represented by item 311, comprises in response to determining that the first electronic module is connected to a connection point for which it is unsuitable, generating an alert.

It may be that a second electronic module in the plurality is connected to the wiring harness via a second connection point in the plurality. In such cases, an optional seventh step of the method 300, represented by item 313, comprises, in response to the connecting, transmitting by the second electronic module, a further connection point identification request.

An optional eighth step of the method 300, represented by item 315, comprises, in response to the transmitting of the further connection point identification request, receiving at the second electronic module from the wiring harness, a further identifier of the second connection point.

An optional ninth step of the method 300, represented by item 317, comprises, on the basis of the received further identifier, determining further configuration data for the second electronic module, the further configuration data being associated with the second connection point.

It may be that the further configuration data differs from the configuration data. It may be that the first electronic module and the second electronic module are, prior to configuration, substantially identical. It may be that the configuration data and the further configuration data differ such that the second electronic module is configured to operate differently to the first electronic module.

An optional tenth step of the method 300, represented by item 321, comprises configuring the second electronic module to operate in accordance with the determined further configuration data.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Whilst in the embodiment illustrated in FIG. 1 the aircraft electrical system 100 comprises three electronic modules, it will be appreciated by the skilled person that, in other embodiments, the aircraft electrical system may comprise more or fewer than three electronic modules.

Whilst the illustrated embodiments show the wiring harness as a series of direct point-to-point links between each of the plurality of electronic modules 103a, 103b, 103c and the central computing node 105, in other embodiments the wiring harness 101 may also provide links between one or more (for example, all) of the plurality of electronic modules 103a, 103b, 103c. Similarly, in yet other embodiments, the wiring harness 101 may connect the plurality of electronic modules 103a, 103b, 103c and the central computing node by means of a bus network topology, rather than by point-to-point links. It will be appreciated by the skilled person that the present invention can be applied to a range of network topologies and configurations.

It will be appreciated that the electronic modules 103a, 103b, 103c and the computing node 105 may each comprise one or more processors and/or memory. Thus, in embodiments, each of the electronic modules 103a, 103b, 103c comprises a processor 205 and associated memory 207. Processor 205 and associated memory 207 may be configured to perform one or more of the above-described functions of the electronic module. Similarly, in embodiments, computing node 105 comprises a processor 213 and associated memory 215. Processor 213 and associated memory 215 may be configured to perform one or more of the above-described functions of computing node 105. Each device, module, component, machine or function as described in relation to any of the examples described herein (for example, the electronic modules 103a, 103b, 103c, the computing node 105, the memory 203, and the light source 209) may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also include computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a random access memory (RAM), a read-only memory (ROM), or an optical memory device, etc.

The one or more processors of the electronic modules 103a, 103b, 103c and the computing node 105 may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

The one or more processors may comprise data storage. The data storage may comprise one or both of volatile and non-volatile memory. The data storage may comprise one or more of RAM, ROM, a magnetic or optical disk and disk drive, or a solid-state drive (SSD). It will be appreciated by the skilled person that many other types of memory, in addition to the examples provided, may also be used. It will be appreciated by a person skilled in the art that the one or more processors may each comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of configuring an aircraft electrical system, wherein:
   the electrical system comprises a wiring harness and a plurality of electronic modules;
   the wiring harness comprises a plurality of connection points;
   a first electronic module in the plurality of electronic modules is connected to the wiring harness via a first connection point in the plurality of connection points;
   a second electronic module in the plurality of electronic modules is connected to the wiring harness via a second connection point in the plurality of connection points; and
   the method comprises:
      transmitting by the first electronic module, a connection point identification request;
      in response to the transmitting, receiving at the first electronic module from the wiring harness, an identifier of the first connection point;
      on the basis of the received identifier, determining configuration data for the first electronic module, the configuration data being associated with the first connection point;
      configuring the first electronic module to operate in accordance with the determined configuration data;
      transmitting by the second electronic module, a further connection point identification request;
      in response to the transmitting, receiving at the second electronic module from the wiring harness, a further identifier of the second connection point;
      on the basis of the received further identifier, determining further configuration data for the second electronic module, the further configuration data being associated with the second connection point; and
      configuring the second electronic module to operate in accordance with the determined further configuration data.

2. The method according to claim 1, wherein:
   the connection point identification request is transmitted to a memory associated with the first connection point; and
   the identifier is received from the memory.

3. The method according to claim 2, wherein the wiring harness comprises the memory.

4. The method according to claim 3, wherein:
   the first connection point comprises a connector having a connector backshell; and
   the memory is located within the connector backshell.

5. The method according to claim 2, wherein:
   a communication interface between the first electronic module and the memory includes a single wire; and
   the transmitting of the connection point identification request and the receiving of the identifier are via the communication interface.

6. The method according to claim 1, wherein:
   the aircraft electrical system comprises an aircraft cabin avionics network;
   each of the plurality of connection points is associated with a different position within the aircraft cabin; and
   the configuring comprises configuring the first electronic module to operate in accordance with the position associated with the first connection point.

7. The method according to claim 1, wherein the further configuration data differs from the configuration data.

8. The method according to claim 1, wherein the first electronic module and the second electronic module are, prior to configuration, substantially identical.

9. The method according to claim 1, wherein the method further comprises:
   on the basis of the received identifier, determining that the first electronic module is connected to a connection point for which it is unsuitable; and
   in response to the determining, generating an alert.

10. The method according to claim 1, wherein the first electronic module comprises one or more of a lighting device, a sensor, a heating and/or cooling unit, or a passenger control unit.

11. A wiring harness comprising memory for use in the method of claim 1.

12. A non-transitory computer readable medium comprising instructions recorded therein which, when executed by a computing device comprising a processor and memory, causes the computing device to carry out a method of configuring an aircraft electrical system, wherein:
   the electrical system comprises a wiring harness and a plurality of electronic modules;

the wiring harness comprises a plurality of connection points;

a first electronic module in the plurality of electronic modules is connected to the wiring harness via a first connection point in the plurality of connection points;

a second electronic module in the plurality of electronic modules is connected to the wiring harness via a second connection point in the plurality of connection points; and the method comprises:
- transmitting by the first electronic module, a connection point identification request;
- in response to the transmitting, receiving at the first electronic module from the wiring harness, an identifier of the first connection point;
- on the basis of the received identifier, determining configuration data for the first electronic module, the configuration data being associated with the first connection point;
- configuring the first electronic module to operate in accordance with the determined configuration data;
- transmitting by the second electronic module, a further connection point identification request;
- in response to the transmitting, receiving at the second electronic module from the wiring harness, a further identifier of the second connection point;
- on the basis of the received further identifier, determining further configuration data for the second electronic module, the further configuration data being associated with the second connection point; and
- configuring the second electronic module to operate in accordance with the determined further configuration data.

13. An aircraft electrical system comprising:

a wiring harness, the wiring harness comprising a plurality of connection points; and a plurality of electronic modules, a first electronic module in the plurality of electronic modules being connected to the wiring harness via a first connection point in the plurality of connection points, and a second electronic module in the plurality of electronic modules is connected to the wiring harness via a second connection point in the plurality of connection points;

wherein the first electronic module is configured to:
- transmit, via the wiring harness, a connection point identification request;
- receive from the wiring harness an identifier of the first connection point;
- on the basis of the received identifier, determine configuration data for the first electronic module, the configuration data being associated with the first connection point; and
- configure the first electronic module to operate in accordance with the determined configuration data, and wherein the second electronic module is configured to:
- transmit, via the wiring harness, a further connection point identification request;
- receive at the second electronic module from the wiring harness, a further identifier of the second connection point;
- on the basis of the received further identifier, determine further configuration data for the second electronic module, the further configuration data being associated with the second connection point; and
- configure the second electronic module to operate in accordance with the determined further configuration data.

14. An aircraft comprising the aircraft electrical system as claimed in claim 13.

\* \* \* \* \*